UNITED STATES PATENT OFFICE.

MAX ENGELMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

2-ALKOXY-5-MONOSUBSTITUTED BARBITURIC ACIDS.

1,038,102.   Specification of Letters Patent.   Patented Sept. 10, 1912.

No Drawing.   Application filed December 9, 1911. Serial No. 664,890.

*To all whom it may concern:*

Be it known that I, MAX ENGELMANN, doctor of philosophy, chemist, citizen of the German Empire, residing at Elberfeld, Germany, have invented new and useful Improvements in 2-Alkoxy-5-Monosubstituted Barbituric Acids, of which the following is a specification.

My invention concerns the production of the hitherto unknown 2-alkoxy-barbituric acids of the formula:

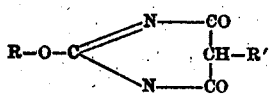

(R is an alkyl, R' a substituent e. g. —CH$_3$, —C$_2$H$_5$, —C$_6$H$_5$, —CH$_2$C$_6$H$_5$) which have proved to be valuable soporifics, an average dose being from ¼ to ½ gram. The process for their production consists in treating the ethers of isourea of the formula:

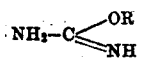

(R—a substituent e. g. alkyl or aralkyl) or their salts with monosubstituted malonyl haloids.

The new products are crystalline compounds being converted by treating them with acids into the 5-monoalkyl- or aryl-barbituric acids.

In order to illustrate the new process more fully the following example is given, the parts being by weight:—100 parts of the ethylether of isourea hydrochlorid:

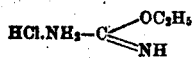

(*Berichte der Deutschen Chemischen Gesellschaft*, vol 33, 1900, p. 810) are dissolved in 300 parts of water and 100 parts of ethyl-malonylchlorid dissolved in 1000 parts of benzene are added. While cooling and stirring 280 parts of caustic soda lye (33 per cent.) are poured to this solution until the mixture reacts alkaline. When the reaction is complete the mixture is acidulated with acetic acid. The 2-ethoxy-5-ethyl-barbituric acid separates in a white crystalline shape. It is after drying recrystallized from alcohol. It melts at 211° C. It is rather slightly soluble in cold water but easily soluble in alkalis and acids. By heating the ether with an acid e. g. HCl it is converted into the 5-ethylbarbituric acid. For this purpose 10 parts of the ether are heated with 50 parts of a strong hydrochloric acid on the water bath chloroethyl being disengaged. The ethylbarbituric acid thus obtained is crystallized from water. The 2-ethoxy-5-benzylbarbituric acid melts at 202° C., the 2-ethoxy-5-phenyl-barbituric acid melts at 218° C.

Instead of the ethylether other derivatives e. g. isourea-methyl-ether or isourea-benzyl-ether can also be used.

I claim:—

1. The herein described 2-alkoxy-barbituric acids having most probably the formula:

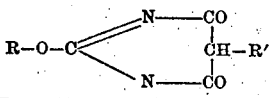

in which R=alkyl, and R'=a substituent being crystalline powders; being converted into mono-substituted barbituric acids by treatment with a hot acid; and being valuable soporifics, substantially as described.

2. The herein described 2-alkoxy-barbituric acids, having most probably the formula:

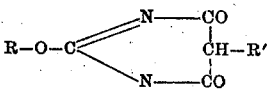

in which R=alkyl, and R'=an alkyl group, being crystalline powders; being converted into mono-substituted barbituric acids by treatment with a hot acid; and being valuable soporifics, substantially as described.

3. The herein described 2-ethoxy-5-ethyl-barbituric acid being a white crystalline powder melting at 211° C. difficultly soluble in cold water, easily soluble in alkalis and in acids; and being a valuable soporific, substantially as described.

In testimony whereof I have hereunto set my hand in the presence of two subscribing witnesses:

MAX ENGELMANN. [L. S.]

Witnesses:
 HELEN NUFER,
 ALBERT NUFER.